(12) United States Patent
Vandenberg

(10) Patent No.: US 6,431,852 B1
(45) Date of Patent: Aug. 13, 2002

(54) INTERNAL LATCH FOR AN INJECTION MOLD

(76) Inventor: Leo A. Vandenberg, 32995 Meadow Rd., Wildwood, IL (US) 60030

( * ) Notice: Subject to any disclaimer, the term of this patent is extended or adjusted under 35 U.S.C. 154(b) by 0 days.

(21) Appl. No.: 09/776,581

(22) Filed: Feb. 2, 2001

(51) Int. Cl.$^7$ ................................. B29C 45/64
(52) U.S. Cl. ................ 425/589; 425/450.1; 425/451.9; 425/595
(58) Field of Search ............... 425/589, 450.1, 425/451.9, 595, 190, 192 R

(56) References Cited

U.S. PATENT DOCUMENTS

| | | | | |
|---|---|---|---|---|
| 4,315,727 A | * | 2/1982 | Black | 425/451.9 |
| 4,372,738 A | * | 2/1983 | Black et al. | 425/451.9 |
| 4,561,626 A | * | 12/1985 | Black | 425/451.9 |
| 5,256,364 A | | 10/1993 | Herbst | |
| 5,314,323 A | * | 5/1994 | Bolles | 425/451.9 |
| 5,494,435 A | | 2/1996 | Vandenberg | |

* cited by examiner

Primary Examiner—Tim Heitbrink
(74) Attorney, Agent, or Firm—Henderson & Sturm LLP

(57) ABSTRACT

An internal latch for an injection mold that allows opening of the mold at parting lines while selected plates are locked in position and prevented from moving. The system includes an external bushing, an internal bushing that carries cam retainers, and a locking pin. The system may be used in an injection mold having in sequence a stationary plate, a stripper plate and a support plate. The external bushing is secured to the support plate, the internal bushing is secured to the stripper plate, and the locking pin is secured to the stationary plate. The cam retainers selectively engage grooves in the external bushing to lock the stripper plate from moving with respect to the support plate when the locking pin is inserted into the internal bushing beyond the location of the cam retainers. When the locking pin is extracted from the internal bushing, the cam retainers are free to move inwardly thus unlocking the stripper plate from the support plate.

4 Claims, 2 Drawing Sheets

INTERNAL LATCH FOR AN INJECTION MOLD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the field of injection molding apparatus, and more particularly to an internal latch system for an injection mold.

2. Description of the Related Art

In injection molds that include multiple plates there are many uses for a device that allows opening of the mold at parting lines while selected plates are prevented from moving. Devices that are presently available do not allow the plates to be returned mechanically without possibility of damage to the mold if a plate moves out of sequence.

As a consequence of the foregoing situation, there has existed a longstanding need for a new and improved internal latch system for an injection mold, and the provision of such a construction is a stated objective of the present invention.

BRIEF SUMMARY OF THE INVENTION

Briefly stated, the present invention provides an internal latch for an injection mold that allows opening of the mold at parting lines while selected plates are locked in position and prevented from moving. The system includes an external bushing, an internal bushing that carries cam retainers, and a locking pin. The system may be used in an injection mold having in sequence a stationary plate, a stripper plate and a support plate. The external bushing is secured to the support plate, the internal bushing is secured to the stripper plate, and the locking pin is secured to the stationary plate. The cam retainers selectively engage grooves in the external bushing to lock the stripper plate from moving with respect to the support plate when the locking pin is inserted into the internal bushing beyond the location of the cam retainers. When the locking pin is extracted from the internal bushing, the cam retainers are free to move inwardly thus unlocking the stripper plate from the support plate.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
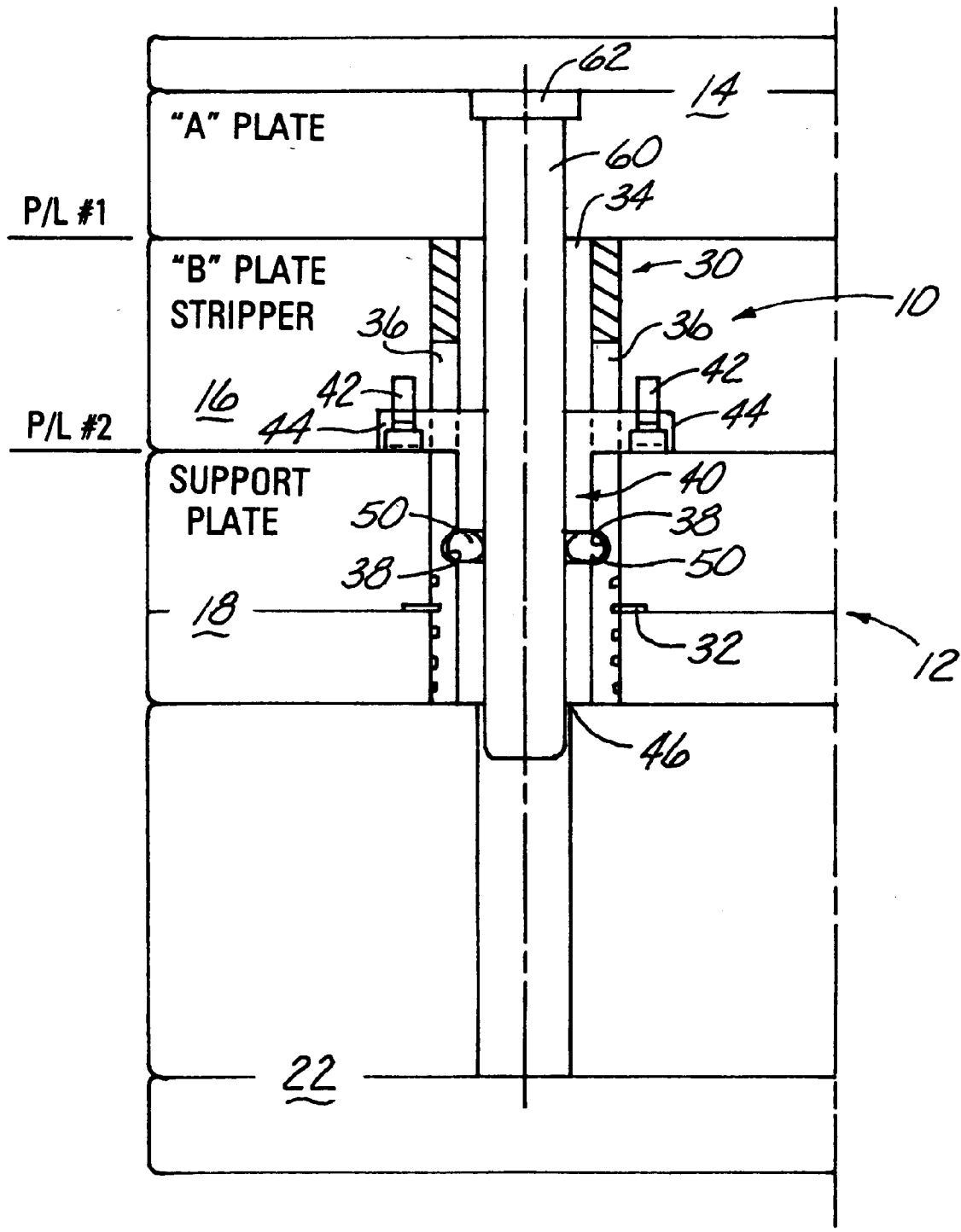
FIG. 1 is a sectional view showing the internally disposed latch system where the mold is in the closed position and the stripper plate is locked against movement with respect to the support plate by the cam retainers.
Figure 2:
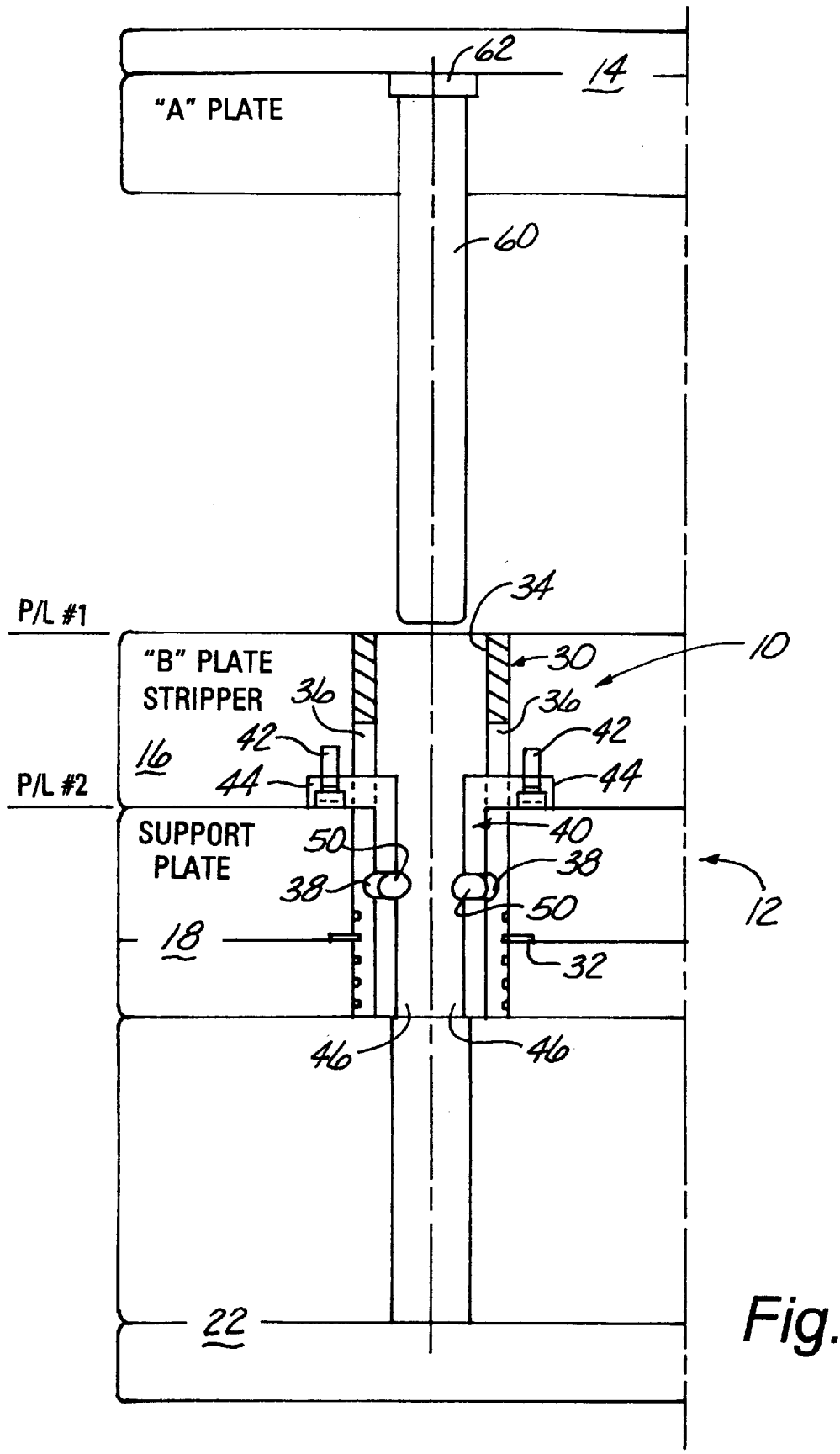
FIG. 2 is a sectional view similar to FIG. 1, but showing the mold open at the first parting line where the stationary plate is spaced apart from the stripper plate, and the stripper plate and support plate are unlocked since the cam retainers are free to move inward in the internal bushing.

As can be seen by reference to the drawings, and in particular to FIGS. 1–2, the internal latch system that forms the basis of the present invention is designated generally by the reference number 10. The latch system 10 is installed in the interior of a multi-plate mold 12 that includes in sequence a stationary plate 14, a stripper plate 16 and a support plate 18 secured and aligned with a housing 22 by a number of tie rods (not shown). A first parting line is located at the contacting surfaces of the stationary plate 14 and the stripper plate 16, and a second parting line is at the contacting surfaces of the stripper plate 16 and the support plate 18. The latch system 10 includes four main components: an external bushing 30, an internal bushing 40, cam retainer fingers 50, and a locking pin 60.

The latch system 10 is located internal to the mold plates and allows for travel of the various plates. The system 10 is held in position by various retaining means. The external bushing 30 is received within a bore in the stripper plate 16 and support plate 18 and is secured to the support plate 18 by a radially extending ring 32 that is clamped between two sections of the support plate 18. The external bushing 30 includes a first axial bore 34 with a pair of opposed axially directed slots 36 and an internal annular ring 38.

The internal bushing 40 is received in the first axial bore 34 of the external bushing 30 and is secured to the stripper plate 16 by fasteners 42 that extend through the pair of wings 44. The wings 44 slidably engage the slots 36, in a manner similar to the cam retainer and travel bushing disclosed in U.S. Pat. No. 5,494,435. The internal bushing 40 has a second axial bore 46 with four radially directed cam retainer fingers 50 that selectively extend outwardly (FIG. 1) or inwardly (FIG. 2) from the wall of the internal bushing 40 and are secured therein, for example as disclosed in U.S. Pat. No. 5,494,435.

The locking pin 60 is received in the second axial bore 46 of the internal bushing 40 and is secured to the stationary plate 14 by a heel 62 clamped between two sections of the stationary plate 14. When the locking pin 60 is inserted into the internal bushing 40 beyond the location of the cam retainers 50, the cam retainers 50 engage the annular ring 38 of the external bushing 30 and locks the stripper plate 16 against movement with respect to the support plate 18. When the locking pin 60 is extracted from the second axial bore 46 of the internal bushing 40, the cam retainers 50 are then free to extend inwardly from the wall of the internal bushing 40 which unlocks the stripper plate 16 from the support plate 18. When the mold 12 is closed from the open position, the locking pin 60, by contacting the cam retainers 50, acts to bring the stripper plate 16 to the starting locked position with respect to the support plate 18 as shown in FIG. 1.

The internal latch system 10 is very useful since it is internal to the mold 12, allows for movement of the different plates while locking other plates from moving, and uses round components that are easy to machine.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. An internal latch system for an injection mold having in sequence a stationary plate, a stripper plate and a support plate, the plates being selectively movable with respect to each other, a first parting line disposed at contacting surfaces of the stationary plate and the stripper plate, and a second parting line disposed at the contacting surfaces of the stripper plate and the support plate, the internal latch system comprising:

an external bushing received within a bore in the stripper plate and support plate and secured against movement with respect to the support plate, the external bushing including a first axial bore with a pair of opposed axially directed slots and an internal annular groove formed therein;

an internal bushing received within the first axial bore of the external bushing and being secured against movement with respect to the stripper plate, the internal bushing including a pair of wings disposed to slidably engage the slots of the external bushing and a second axial bore with a plurality of radially directed cam retainers movable to selectively extend outwardly to engage the internal annular groove of the external bushing or to extend inwardly;

a locking pin received within the second axial bore of the internal bushing and being secured against movement with respect to the stationary plate, the locking pin being disposed to selectively contact the cam retainers to prevent them from extending inwardly from the second axial bore of the internal bushing, thereby locking the cam retainers into engagement with the internal annular groove of the exterior bushing and thus locking the stripper plate against movement with respect to the support plate.

2. The internal latch system for an injection mold of claim 1 wherein the external bushing is secured to the support plate by a radially extending ring clamped between two portions of the support plate.

3. The internal latch system for an injection mold of claim 1 wherein the internal bushing is secured to the stripper plate by fasteners extending through a pair of radially extending wings of the internal bushing.

4. The internal latch system for an injection mold of claim 1 wherein the locking pin is secured to the stationary plate by a heel disposed at one end of the locking pin clamped between two portions of the stationary plate.

* * * * *